United States Patent
Leflaive et al.

(10) Patent No.: US 10,822,555 B2
(45) Date of Patent: Nov. 3, 2020

(54) METHOD FOR SWEETENING AN OLEFINIC PETROL OF SULPHIDE-TYPE COMPOUNDS

(71) Applicant: IFP Energies nouvelles, Rueil-Malmaison (FR)

(72) Inventors: Philibert Leflaive, Mions (FR); Clementina Lopez Garcia, Irigny (FR); Julien Gornay, Les Cotes D'Arey (FR); Annick Pucci, Croissy sur Seine (FR); Diamantis Asteris, Chatou (FR); Marie Godard-Pithon, Rueil Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 15/566,611

(22) PCT Filed: Feb. 17, 2016

(86) PCT No.: PCT/EP2016/053303
§ 371 (c)(1),
(2) Date: Oct. 13, 2017

(87) PCT Pub. No.: WO2016/165853
PCT Pub. Date: Oct. 20, 2016

(65) Prior Publication Data
US 2018/0148658 A1    May 31, 2018

(30) Foreign Application Priority Data
Apr. 15, 2015 (FR) ..................... 15 53340

(51) Int. Cl.
*C10G 65/06* (2006.01)
*B01J 23/888* (2006.01)
(Continued)

(52) U.S. Cl.
CPC ............ *C10G 65/06* (2013.01); *B01J 23/881* (2013.01); *B01J 23/882* (2013.01); *B01J 23/883* (2013.01);
(Continued)

(58) Field of Classification Search
None
See application file for complete search history.

(56) References Cited

U.S. PATENT DOCUMENTS 2,431,920 A   12/1947  Cole
3,451,922 A   6/1969   Parker
(Continued)

FOREIGN PATENT DOCUMENTS

EP   1077247 A1   2/2001
EP   1174485 A1   1/2002
(Continued)

OTHER PUBLICATIONS

International Search Report PCT/EP2016/053303 dated Feb. 17, 2016.

*Primary Examiner* — In Suk C Bullock
*Assistant Examiner* — Alyssa L Cepluch
(74) *Attorney, Agent, or Firm* — Millen, White, Zelano and Branigan, P.C.

(57) ABSTRACT

A process reducing sulfides R1-S-R2, with R1 and R2 methyl or ethyl, in a gasoline containing diolefins, mono-olefins and sulphur:
A) contacting gasoline in mixture with a light gasoline cut recycled from C) and hydrogen in a reactor with catalyst A at least one VIb metal and at least one non noble group VIII metal on a support, producing effluent having diole-fins and sulfides R1-S-R2, with R1 and R2 methyl or ethyl radicals lower than that that of the starting gasoline;
B) the effluent from A) is sent into a fractionating column separating at the top a light gasoline cut containing
(Continued)

hydrocarbons having less than 6 carbon atoms per molecule and at the bottom a heavy gasoline cut containing hydrocarbons having 6 and more than 6 carbon atoms per molecule;

C) recycling a part of the light gasoline from B) to the reactor of A) with a recycle ratio 0.1 to 0.7.

8 Claims, 1 Drawing Sheet

(51) Int. Cl.
    *B01J 37/20*     (2006.01)
    *B01J 23/883*     (2006.01)
    *B01J 35/10*     (2006.01)
    *C10G 45/08*     (2006.01)
    *C10L 1/06*     (2006.01)
    *C10G 45/38*     (2006.01)
    *B01J 23/881*     (2006.01)
    *B01J 23/882*     (2006.01)
    *C10G 67/02*     (2006.01)

(52) U.S. Cl.
    CPC ......... *B01J 23/888* (2013.01); *B01J 35/1014* (2013.01); *B01J 35/1019* (2013.01); *B01J 37/20* (2013.01); *C10G 45/08* (2013.01); *C10G 45/38* (2013.01); *C10G 67/02* (2013.01); *C10L 1/06* (2013.01); *C10G 2300/104* (2013.01); *C10G 2300/1044* (2013.01); *C10G 2300/1088* (2013.01); *C10G 2300/202* (2013.01); *C10G 2300/4081* (2013.01); *C10G 2400/02* (2013.01)

(56) References Cited

U.S. PATENT DOCUMENTS

| | | | |
|---|---|---|---|
| 6,896,795 B2 | 5/2005 | Didillon | |
| 6,972,086 B2 | 12/2005 | Didillon | |
| 7,306,714 B2 | 12/2007 | Uzio | |
| 7,645,376 B2 | 1/2010 | Bouchy | |
| 7,981,828 B2 | 7/2011 | Devers | |
| 8,034,233 B2 * | 10/2011 | Picard | C10G 45/08 208/209 |
| 9,505,686 B2 | 11/2016 | Daudin | |
| 2003/0230516 A1 | 12/2003 | Johnson | |
| 2004/0000506 A1 | 1/2004 | Podrebarac | |
| 2012/0043260 A1 | 2/2012 | Podrebarac | |
| 2013/0261357 A1 * | 10/2013 | Daudin | C07C 5/13 585/253 |
| 2014/0374315 A1 * | 12/2014 | Gornay | C10G 65/04 208/97 |
| 2015/0166908 A1 | 6/2015 | Touzalin | |

FOREIGN PATENT DOCUMENTS

| | | |
|---|---|---|
| EP | 1369466 A1 | 12/2003 |
| EP | 1800748 A2 | 6/2007 |
| EP | 1892039 A1 | 2/2008 |
| EP | 2161076 A1 | 3/2010 |
| EP | 2816094 A1 | 12/2014 |
| FR | 918705 A | 2/1947 |
| FR | 2104631 A5 | 4/1972 |
| FR | 2888583 A1 | 1/2007 |
| FR | 2988732 A1 | 10/2013 |
| FR | 2993571 A1 | 1/2014 |

\* cited by examiner

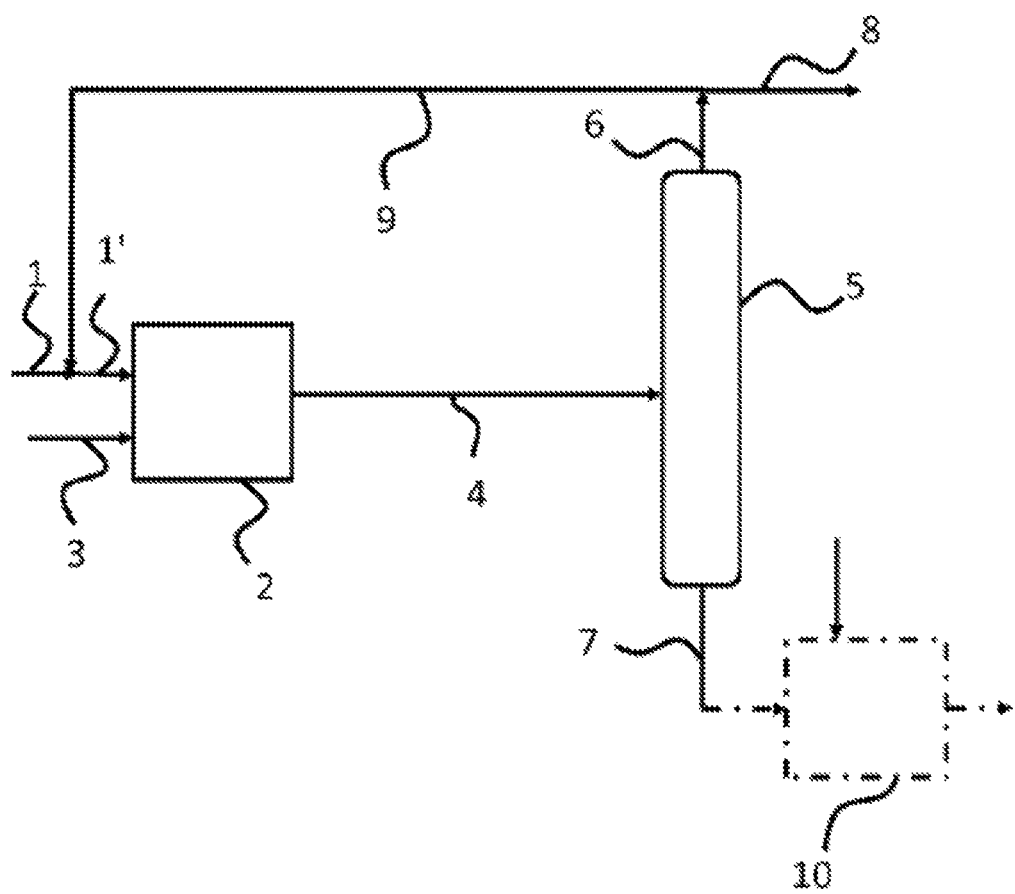

METHOD FOR SWEETENING AN OLEFINIC PETROL OF SULPHIDE-TYPE COMPOUNDS

The present invention relates to a process for reducing the content of compounds of the sulphide type of formula R1-S-R2, with R1 and R2 selected from methyl and ethyl, contained in a gasoline. In particular the process relates to gasolines called olefinic.

The process according to the invention can be incorporated as a pretreatment step in a process for the hydrodesulphurization of a gasoline in order to limit the content of light sulphur compounds of the sulphide type.

STATE OF THE ART

The production of gasolines corresponding to new environmental standards requires that their sulphur content is significantly reduced to values generally not exceeding 50 ppm, and preferentially less than 10 ppm by weight.

It is moreover known that the conversion gasolines, and more particularly those originating from catalytic cracking, which can represent 30 to 50% of the gasoline pool, have high contents of olefins and sulphur.

The sulphur present in the gasolines is for this reason attributable, at close to 90%, to the gasolines originating from catalytic cracking processes, that will be called hereinafter FCC (Fluid Catalytic Cracking) gasoline (catalytic cracking in a fluidized bed). The FCC gasolines therefore constitute the preferred feedstock for the process of the present invention.

Among the possible routes for producing fuels with a low sulphur content, that which has been very widely retained consists of specifically treating the gasoline stocks rich in sulphur by hydrodesulphurization processes in the presence of hydrogen and a catalyst. The conventional processes desulphurize the gasolines in a non-selective manner by hydrogenating a large part of the mono-olefins, which causes a sharp drop in octane number and a high hydrogen consumption. The more recent processes, such as the Prime G+ process (trade mark), make it possible to desulphurize the cracking gasolines rich in olefins, while limiting the hydrogenation of the mono-olefins and as a result the loss of octane and the high consumption of hydrogen which results therefrom. Such processes are for example described in patent applications EP 1077247 and EP 1174485.

As described in patent applications EP 1077247 and EP 1 800 748, it is advantageous to carry out a step of selective hydrogenation of the feedstock to be treated, before the hydrotreatment step. This first hydrogenation step essentially consists of selectively hydrogenating the diolefins, while simultaneously transforming the saturated light sulphur-containing compounds into heavier compounds (by increasing their molecular weight), which are sulphur-containing compounds with a boiling point less than that of thiophene, such as methanethiol, ethanethiol, propanethiol, dimethylsulphide and ethyl-methylsulphide. By fractionating the gasoline originating from the selective hydrogenation step, a light desulphurized gasoline cut (or Light Cracked Naphtha (LCN)) is produced, the majority of which is composed of mono-olefins with 5 or 6 carbon atoms without loss of octane, which can be upcycled to the gasoline pool for the formulation of fuel for vehicles.

Under specific operating conditions, this hydrogenation selectively carries out the hydrogenation of the diolefins present in the feedstock to be treated to mono-olefinic compounds, which have a better octane number. Another effect of the selective hydrogenation is to prevent the progressive deactivation of the selective hydrodesulphurization catalyst and/or to avoid a progressive clogging of the reactor due to the formation of polymerization gums on the surface of the catalysts or in the reactor. In fact, the polyunsaturated compounds are unstable and have tendency to form gums by polymerization.

Patent application EP 2161076 discloses a selective hydrogenation process for polyunsaturated compounds, and more particularly diolefins, making it possible to simultaneously transform the saturated light sulphur-containing compounds into heavier compounds. This process utilizes a catalyst containing, deposited on a porous support, at least one metal of group VIb and at least one non-noble metal of group VIII.

It has been noted that when the content of light sulphur-containing compounds, i.e. of formula R1-S-R2 with R1 and R2 selected from methyl and ethyl was significant, the selective hydrogenation step was not efficient enough to convert these compounds so that after fractionation a light gasoline cut LCN is obtained containing an appreciable quantity of light sulphur-containing compounds. To address this problem, it is quite possible to envisage making the temperature conditions of the selective hydrogenation step more severe, but at the cost of a premature deactivation of the catalyst and a rapid clogging of the internal parts of the reactor, these phenomena being linked to the formation of coke by polymerization of the diolefins contained in the gasoline to be treated. Another solution would consist of reducing the liquid hourly space velocity of the gasoline to be treated in the reactor but would require more catalyst to be used and the height of the reactor to be increased; however this solution is not necessarily desirable from the economic and/or technical point of view.

An aim of the invention is therefore to propose a process which is improved in terms of efficiency for reducing the content of compounds of the light sulphide type in a gasoline (or a mixture of gasolines) and which can be operated over longer time cycles before replacement of the catalyst and/or cleaning of the installation in which the process is carried out.

SUMMARY OF THE INVENTION

The present invention relates to a process for reducing the content of compounds of the sulphide type of formula R1-S-R2, with R1 and R2 selected from the methyl ($CH_3$) and ethyl ($C_2H_5$) radicals, in a gasoline containing diolefins, mono-olefins and sulphur, in which:

A) the gasoline in a mixture with a light gasoline cut recycled from step C) and hydrogen are brought into contact in a reactor with catalyst A comprising at least one metal of group VIb and at least one non noble metal of group VIII deposited on a support, step A) being carried out at a temperature in the reactor comprised between 60° C. and 150° C. with a liquid hourly space velocity (LHSV) comprised between 1 $h^{-1}$ and 10 $h^{-1}$, a pressure comprised between 0.5 and 5 MPa and with a ratio by volume (added $H_2$/mixture of gasolines) comprised between 1 to 40 normal litres of hydrogen per litre of the mixture of gasolines (vol/vol), so as to produce an effluent having a content of diolefins and a content of compounds of the sulphide type of formula R1-S-R2, with R1 and R2 selected from the methyl ($CH_3$) and ethyl ($C_2H_5$) radicals lower than that of the starting gasoline;

B) said effluent originating from step A) is sent into a fractionating column in order to separate at the top of the column a light gasoline cut containing hydrocarbons having less than 6 carbon atoms per molecule and at the bottom of the column a heavy gasoline cut containing hydrocarbons having 6 and more than 6 carbon atoms per molecule;

C) a part of the light gasoline cut originating from step B) is recycled into the reactor of step A) with a recycle ratio comprised between 0.1 and 0.7. The recycle ratio is defined as being the ratio of the quantity of recycled light gasoline cut to the total quantity of light gasoline drawn off at the top of the fractionating column.

The applicant has noted that the recycling of the light gasoline cut into the reactor of step A) not only makes it possible to promote the conversion of the compounds of the light sulphide type by retaining as much as possible the octane number of the gasoline, while limiting the deactivation of the catalyst and the clogging of the reactors by the formation of coke deposits on the catalyst and on the internal parts of the reactor respectively.

In the context of the invention, the expression "reduce the content of compounds of the light sulphide type" denotes the fact that the content of compounds of the light sulphide type which are present in the reaction effluent obtained after step A) is lower than that of the gasoline which is treated.

An advantage of the process is linked to the fact that it is possible to improve the yield of the conversion of the compounds of the light sulphide type without having to make the temperature conditions of said step A) more severe, resulting in a premature deactivation of the catalyst and a rapid clogging of the internal parts of the reactor, or increasing the size of the reactor.

Preferably the heavy gasoline cut recovered at the bottom of the fractionating column is treated in a hydrodesulphurization unit in the presence of hydrogen.

Catalyst A is preferably used in its sulphurized form. Preferably the degree of sulphurization of the metals constituting the catalyst is at least equal to 60%, Preferably catalyst A comprises:
  a content of oxide of the metal of group VIb comprised between 4 and 20% by weight with respect to the total weight of the catalyst,
  a content of oxide of the metal of group VIII comprised between 4 to 15% by weight with respect to the total weight of the catalyst,
  a degree of sulphurization of the metals that are constituents of said catalyst at least equal to 60%,
  a molar ratio between the non noble metal of group VIII and the metal of group VIb comprised between 0.6 and 8 mol/mol,
  a specific surface area of the catalyst comprised between 30 and 300 $m^2/g$.

Preferably, the catalyst A has a density per unit area of catalyst of the metal of group VIb less than or equal to $10^{-3}$ gram of oxides of the metal of group VIb per $m^2$ of catalyst.

Preferably the metal of group VIb of catalyst A is selected from molybdenum and tungsten, preferably molybdenum.

Preferably the metal of group VIII of catalyst A is selected from nickel, cobalt and iron, preferably nickel.

In a preferred embodiment, the metal of group VIII is nickel and the metal of group VIb is molybdenum.

The process according to the invention is particularly suitable for treating a gasoline originating from catalytic cracking or thermal cracking, a coking process, a visbreaking process or a pyrolysis process.

BRIEF DESCRIPTION OF DRAWINGS

The FIGURE illustrates a flow sheet of the process according to the invention.

DETAILED DESCRIPTION OF THE INVENTION

The other characteristics and advantages of the invention will become apparent on reading the description which follows, given by way of illustration and non limitatively, and with reference to the FIGURE which is a flow sheet of the process according to the invention.

The feedstock of hydrocarbons which is capable of being treated by the process according to the invention is a gasoline of the olefinic type containing diolefins, mono-olefins, and sulphur-containing compounds in particular in the form of mercaptans and light sulphides. Within the scope of the invention, by the term "compounds of light sulphide type" is meant the compounds of formula R1-S-R2 where R1 and R2 are selected from the methyl ($CH_3$) and ethyl ($C_2H_5$) radicals. Thus, the lightest sulphide present in the olefinic gasoline is dimethylsulphide.

The present invention finds its application for treating gasolines originating from conversion processes, and in particular gasolines (alone or in a mixture) originating from catalytic cracking or thermal cracking, a coking process, a visbreaking process or a pyrolysis process. The feedstocks of hydrocarbons to which the invention relates have a boiling temperature generally comprised between 0° C. and 280° C., preferably comprised between 15° C. and 250° C.

The gasoline treated by the process according to the invention generally contains between 0.5% and 5% by weight of diolefins, between 20% and 55% by weight of mono-olefins, between 10 ppm and 1% by weight of sulphur and has a content of light sulphide compounds of formula R1-S-R2 where R1 and R2 are selected from the methyl ($CH_3$) and ethyl ($C_2H_5$) radicals is generally comprised between 1 and 150 ppm by weight of sulphur.

Preferably the gasoline which is capable of being treated originates from a Fluid Catalytic Cracking unit. A mixture of gasolines originating from a Fluid Catalytic Cracking unit with one or more gasolines originating from another conversion process can also be treated.

With reference to the FIGURE, a feedstock of hydrocarbons of the gasoline type is treated in a mixture with a recycled light gasoline cut in a first catalytic step. Thus, the gasoline feedstock supplied through line 1 and the recycling flow originating from line 9 are sent through line 1' into a reactor 2 and in which the mixture is brought into contact with hydrogen (supplied through line 3) and catalyst A which in particular makes it possible to selectively hydrogenate the diolefins to olefins. The reactor 2 can be a reactor with a fixed or mobile catalytic bed, preferably fixed. The reactor can comprise one or more catalytic beds.

The quantity of hydrogen injected is such that the ratio by volume (added $H_2$/mixture of gasolines) is comprised between 1 and 40 normal litres of hydrogen per litre of the mixture of gasolines (vol/vol), and preferably comprised between 1 and 5 normal litres of hydrogen per litre of the mixture of gasoline (vol/vol). Too large an excess of hydrogen can lead to a strong hydrogenation of the mono-olefins and as a result, a reduction in the octane number of the gasoline. All of the feedstock is generally injected into the inlet of the reactor. However, it can be advantageous in certain cases to inject a part or all of the feedstock between two consecutive catalytic beds placed in the reactor. This embodiment makes it possible in particular to continue to operate the reactor if the inlet of the reactor or the first catalytic bed becomes clogged by deposits of polymers, particles, or gums present in the feedstock.

The mixture of gasolines and hydrogen are brought into contact with catalyst A at a temperature comprised between 60° C. and 150° C. and preferably comprised between 80 and 130° C., with a liquid hourly space velocity (LHSV) comprised between 1 h$^{-1}$ and 10 h$^{-1}$, the liquid hourly space velocity unit being expressed in litres of the mixture of gasolines per hour per litre of catalyst (L/h/L, i.e. h$^{-1}$). The pressure is adjusted so that the reaction mixture is in the majority in liquid form in the reactor. The pressure is generally comprised between 0.5 MPa and 5 MPa and preferably comprised between 1 and 4 MPa.

As indicated in the FIGURE, a reaction effluent is drawn off from the reactor 2 through line 4. This effluent has a lower content of diolefins compared to the gasoline to be treated because of the selective hydrogenation reaction that it has undergone. The effluent originating from the hydrogenation reactor 2 has a temperature close to the average temperature of the reactor 2 and generally greater (typically from 1 to 3° C.) than that of the feedstock at the inlet of the reactor 2, given that the selective hydrogenation reaction of the diolefins is exothermic.

It has been observed that the effluent obtained after step A) also has a lower content of compounds of the light sulphide type. These compounds however have not undergone a hydrodesulphurization (HDS) reaction, as the effluent obtained after step A) does not contain H$_2$S. Without being bound by any theory, the catalyst used in step A) makes it possible to react the light sulphide compounds described above with the olefins of the feedstock in order to form sulphide compounds with a higher molecular weight which are capable of being separated from the effluent by distillation. It should be noted that this catalytic step is different from a hydrodesulphurization (or HDS) catalytic step in which the sulphur-containing compounds are converted to H$_2$S and to hydrocarbons by contact with a catalyst having hydrogenolyzing propieties. The hydrodesulphurization is generally operated at a temperature comprised between 200 and 400° C., with an added H$_2$/gasoline feedstock ratio by volume comprised between 100 to 600 normal litres of hydrogen per litre of gasoline (vol/vol), at a total pressure comprised between 1 MPa and 3 MPa and with a liquid hourly space velocity (LHSV) comprised between 1 h$^{-1}$ and 10 h$^{-1}$.

Catalyst A utilized in the process according to the invention comprises at least one metal of group VIb (group 6 according to the new notation of the periodic table of the elements: Handbook of Chemistry and Physics, 76th edition, 1995-1996) and at least one non noble metal of group VIII (groups 8, 9 and 10 according to the new notation of the periodic table of the elements: Handbook of Chemistry and Physics, 76th edition, 1995-1996) deposited on a support.

Preferably catalyst A is used in the sulphurized form. Preferably, the degree of sulphurization of catalyst A is at least 60%.

The sulphurization of the catalyst can be carried out in a sulphur reducing medium, i.e. in the presence of H$_2$S and hydrogen, in order to convert the metal oxides to sulphides such as for example, MoS$_2$ and Ni$_3$S$_2$. The sulphurization is for example carried out by injecting onto the catalyst a flow containing H$_2$S and hydrogen, or a sulphur-containing compound capable of decomposing into H$_2$S in the presence of the catalyst and hydrogen. The polysulphides such as dimethyldisulphide are precursors of H$_2$S commonly used for sulphurizing the catalysts. The temperature is adjusted so that the H$_2$S reacts with the metal oxides in order to form metal sulphides. This sulphurization can be carried out in situ or ex situ (inside or outside) of the reactor of step A) at temperatures comprised between 200 and 600° C., and more preferentially between 300 and 500° C.

An element is considered as substantially sulphurized when the molar ratio between the sulphur (S) present on the catalyst and said element is preferably at least equal to 60% of the theoretical molar ratio corresponding to the total sulphurization of the element considered:

$$(S/\text{element})_{catalyst} \geq 0.6 \times (S/\text{element})_{theoretical}$$

with:

$(S/\text{element})_{catalyst}$=molar ratio between sulphur (S) and the element present on the catalyst $(S/\text{element})_{theoretical}$=molar ratio between the sulphur and the element corresponding to the total sulphurization of the element to sulphide.

This theoretical molar ratio varies according to the element considered:

$(S/Fe)_{theoretical}=1$ $(S/Co)_{theoretical}=8/9$ $(S/Ni)_{theoretical}=2/3$ $(S/Mo)_{theoretical}=2/1$ $(S/W)_{theoretical}=2/1$ When the catalyst comprises several metals, the molar ratio between the S present on the catalyst and all the elements is preferably at least equal to 60% of the theoretical molar ratio corresponding to the total sulphurization of each element to sulphide, the calculation being carried out in proportion to the relative mole fractions of each element.

For example, for a catalyst comprising molybdenum and nickel with a respective mole fraction of 0.7 and 0.3, the minimal molar ratio (S/Mo+Ni) is given by the relationship:

$$(S/Mo+Ni)_{catalyst}=0.6\times\{(0.7\times 2)+(0.3\times(2/3))\}$$

Very preferably, the degree of sulphurization of the metals will be greater than 80%. Preferably the sulphurization is implemented on the metals in the form of oxide without carrying out a prior step of reducing the metals. In fact, it is known that the sulphurization of reduced metals is more difficult than the sulphurization of metals in the form of oxides.

Catalyst A according to the invention can have the following characteristics:
- a content of oxide of the metal of group VIb is comprised between 4 and 20% by weight with respect to the total weight of the catalyst,
- a content of oxide of the metal of group VIII is comprised between 4 and 15% by weight with respect to the total weight of the catalyst,
- a degree of sulphurization of the metals constituting said catalyst is at least equal to 60%,
- a molar ratio between the non noble metal of group VIII and the metal of group VIb is comprised between 0.6 and 8 mol/mol,
- a specific surface area of the catalyst is comprised between 30 and 300 m$^2$/g.

Catalyst A preferably has a content by weight of the element of group VIb in the oxide form comprised between 6 and 18%, preferably comprised between 8 and 12% and yet more preferably comprised between 10 and 12% by weight with respect to the weight of catalyst. The metal of group VIb is preferably selected from molybdenum and tungsten. More preferably, the metal of group VIb is molybdenum.

Catalyst A also contains a metal of group VIII preferably selected from nickel, cobalt and iron. More preferably, the metal of group VIII is nickel. The content of the metal of group VIII expressed in the form of oxide is comprised between 4 and 12% by weight and preferably comprised between 6 and 10% by weight and of yet more preferably between 6 and 8% by weight with respect to the weight of catalyst.

The molar ratio between the non noble metal of group VIII and the metal of group VIb is comprised between 0.6 and 8 mol/mol and preferably comprised between 1 and 3 mol/mol. The density of the metal of group VIb, expressed as being the ratio between said content by weight of oxide of the metal of group VIb and the specific surface area of the catalyst, is less than or equal $10^{-3}$ g/m$^2$, preferably comprised between $10^{-4}$ and $10^{-3}$ g/m$^2$. Preferably the density of metal of group VIb is comprised between 4 and $6.10^{-4}$ g/m$^2$. Thus, for example in the specific case where the catalyst comprises 11% by weight of molybdenum oxide with respect to the weight of catalyst and has a specific surface area of 219 m$^2$/g, while the density of molybdenum, expressed as being the ratio between the content by weight of molybdenum oxide (MoO$_3$) and the specific surface area of the catalyst, is equal to (0.11/219) i.e. $5.10^{-4}$ g/m$^2$.

The specific surface area of the catalyst A is preferably comprised between 100 and 300 m$^2$/g and more preferably comprised between 150 and 250 m$^2$/g. The specific surface area is determined according to the standard ASTM D3663.

Preferably, the catalyst A has a total pore volume measured by mercury porosimetry greater than 0.3 cm$^3$/g, preferably comprised between 0.4 and 1.4 cm$^3$/g and preferentially comprised between 0.5 and 1.3 cm$^3$/g. The mercury porosimetry is measured according to the standard ASTM D4284-92 with a wetting angle of 140°, with a device of the model Autopore III trade mark Micromeritics.

The support of the catalyst A is preferably selected from alumina, nickel aluminate, silica, silicon carbide, or mixture thereof. Preferably, alumina is used.

According to a variant, the support of the catalyst A is constituted by cubic gamma alumina or delta alumina.

According to a particularly preferred variant, the catalyst A is an NiMo catalyst on alumina. Catalyst A according to the invention can be prepared using any technique known to a person skilled in the art, and in particular by impregnation of the elements of groups VIII and VIb on the selected support. This impregnation can for example be carried out according to the method known to a person skilled in the art by the term dry impregnation, in which exactly the quantity of desired elements is introduced in the form of salts soluble in the solvent selected, for example demineralized water, so as to fill the porosity of the support as precisely as possible.

After introducing the elements of groups VIII and VIb, and optionally forming the catalyst, the latter is subjected to an activation treatment. This treatment generally has the aim of converting the molecular precursors of the elements to the oxide phase. In this case it is an oxidizing treatment, but a simple drying of the catalyst can also be carried out. In the case of an oxidizing treatment, also called calcination, the latter is generally implemented under air or under diluted oxygen, and the treatment temperature is generally comprised between 200° C. and 550° C., preferably between 300° C. and 500° C.

After calcination, the metals deposited on the support are in the form of oxide. In the case of nickel and molybdenum, the metals are found principally in the form of MoO$_3$ and NiO. Preferably, catalyst A is used in the sulphurized form i.e., it has undergone a sulphurization activation step after the oxidizing treatment.

According to the invention, the effluent originating from the reactor 2 is drawn off from said reactor and sent through line 4 into a dedicated fractionating column 5 in order to provide at least one cut of light gasoline 6 (or Light Cracked Naphtha (LCN)) which is drawn off at the top of column 5 and a cut of heavy gasoline 7 (Heavy Cracked Naphtha (HCN)) which is recovered at the bottom of column 5. It should be noted that this fractionation step is carried out subsequent to the catalytic step A) in a column dedicated only to the separation unlike an implementation in a catalytic distillation column where the catalytic reaction and the separation are carried out concomitantly.

The cut point of the fractionating column is selected so that the cut of light gasoline contains hydrocarbons (essentially olefins) having less than six carbon atoms and a low content of compounds of the light sulphide type and that the cut of heavy gasoline has a significant quantity of sulphur-containing compounds such as mercaptans, the compounds of the thiophene family and sulphides and hydrocarbons (essentially olefins) having six or more than six carbon atoms ("C6+"). Typically, the cut point is adjusted so that the cut of light gasoline has a boiling temperature comprised between −5° C. and 70° C., preferably comprised between −5° C. and 65° C. As regards the cut of heavy gasoline, it can have a boiling temperature comprised between 60° C. and 280° C., preferably comprised between 65° C. and 280° C. A person skilled in the art knows that the separations of hydrocarbons are imperfect and, as a result, a certain overlapping of the boiling points of the light and heavy cuts can occur close to the cut point. Typically, the light gasoline cut has a total sulphur content less than 15 ppm, preferably less than 10 ppm by weight and a content of light sulphides less than 10 ppm by weight of sulphur.

According to the invention, the cut of light gasoline 6 thus produced by the fractionation, which is rich in olefins (therefore with a high octane number) and depleted in sulphur-containing compounds, including the light sulphides, is divided into two flows 8 and 9, after optional removal of the hydrogen and stabilization. As indicated in the FIGURE, the flow 8 is sent to the gasoline pool for the formulation of gasoline type fuel. This light gasoline cut depleted in sulphur does not generally require additional hydrodesulphurization treatment.

As regards the complementary flow 9, according to the invention, it is recycled into the reactor 2. The recycling ratio of the light gasoline cut depleted in sulphur is defined as being the ratio of the flow 9 to the flow 6, is comprised between 0.1 and 0.7 and preferably comprised between 0.3 and 0.6.

The heavy gasoline cut 7 which contains the majority of the organo-sulphur compounds including the sulphides, is advantageously treated in a hydrodesulphurization (HDS) unit comprising a reactor 10 equipped with a catalyst bed having hydrogenolyzing properties. The HDS catalyst can comprise at least one metal of group VIb, for example molybdenum, and at least one metal of group VIII, for example cobalt, deposited on a support. Reference can be made in particular to documents EP 1 369 466 and EP 1 892 039 by the applicant which describe HDS catalysts.

The operating conditions allowing a hydrodesulphurization in the presence of hydrogen of the heavy gasoline cut are:

- a temperature comprised between approximately 200 and approximately 400° C., preferentially comprised between 250 and 350° C.;
- a total pressure comprised between 1 MPa and 3 MPa, preferentially comprised between 1 MPa and approximately 2.5 MPa;
- an added $H_2$/gasoline feedstock ratio by volume comprised between 100 and 600 normal litres of hydrogen per litre of gasoline (vol/vol); and
- a liquid hourly space velocity (LHSV) comprised between 1 $h^{-1}$ and 10 $h^{-1}$, preferentially comprised between 2 $h^{-1}$ and 8 $h^{-1}$.

The desulphurized heavy gasoline cut, after removal of the $H_2S$ formed by the catalytic hydrodesulphurization reaction and stabilization, can then be sent to the gasoline pool and/or to the diesel pool depending on the requirements of the refiner.

The process according to the invention can thus be incorporated into a hydrodesulphurization unit as a pretreatment step of the gasoline before the hydrodesulphurization step itself.

EXAMPLES

Example 1 (Comparative)

Table 1 presents the general characteristics of a gasoline which has been treated according to the invention. The MAV is the Maleic Anhydride Value and gives an indication of the content of conjugated diolefins (precursor compounds of gums) in the gasolines.

TABLE 1

| Characteristics of the gasoline | | |
|---|---|---|
| Composition of the gasoline | Unit | Value |
| Density at 15° C. | g/cm³ | 0.718 |
| MAV | g/100 g | 15 |
| Content of elemental sulphur | % m/m | 0.192 |
| Content of light sulphides | | |
| Dimethyl sulphide | ppm S | 1.8 |
| Methyl-ethyl-sulphide | ppm S | 4.5 |
| Content of olefins | % m/m | 49.0 |
| Simulated distillation | | |
| T 5% | ° C. | 23 |
| T 95% | ° C. | 179 |
| RON of the gasoline | — | 87.2 |
| MON of the gasoline | — | 76.6 |

The gasoline is treated in the presence of catalyst A in a selective hydrogenation reactor.

Catalyst A is a catalyst of NiMo type on gamma alumina. The contents of metals are respectively 7% by weight NiO and 11% by weight $MoO_3$ with respect to the total weight of the catalyst, i.e. an Ni/Mo molar ratio of 1.2. The specific surface area of the catalyst is 230 $m^2/g$. Prior to its use, the catalyst A is sulphurized at atmospheric pressure on a sulphurization bench under an $H_2S/H_2$ mixture constituted by 15% by volume of $H_2S$ to 1 L/g·h of catalyst and at 400° C. for two hours. This protocol makes it possible to obtain a degree of sulphurization greater than 80%.

Table 2 shows the operating conditions implemented as well as the results of conversion of the light sulphides during the selective hydrogenation step.

TABLE 2

| | | | | | | Dimethyl-sulphide | | Methyl-ethyl-sulphide | |
|---|---|---|---|---|---|---|---|---|---|
| Example | LHSV $h^{-1}$ | added $H_2$/HC NL/L | Temperature ° C. | Pressure MPa | residual MAV mg/100 g | Content ppm by weight S | Conversion % | Content ppm by weight S | Conversion % |
| 1 | 1.5 | 5 | 140 | 2.5 | 0.6 | 0.9 | 50% | 3.0 | 33% |

The effluent of the selective hydrogenation step is sent into a fractionating column in order to separate at the top of the column a light gasoline cut containing hydrocarbons having less than 6 carbon atoms per molecule and at the bottom of the column a heavy gasoline cut containing hydrocarbons having 6 and more than 6 carbon atoms per molecule.

The contents of dimethyl-sulphide and methyl-ethyl-sulphide in the light gasoline cut are respectively 4.5 and 6.3 ppm by weight, i.e. a total content of sulphides of 10.8 ppm by weight.

Example 2 (According to the Invention)

The gasoline of Example 1 is treated in the process according to the invention with a recycle ratio of 0.5.

Taking into account the recycling, the feedstock treated in the presence of catalyst A in the selective hydrogenation reactor has a content of dimethyl-sulphide and methyl-ethyl-sulphide of respectively 2.1 and 4.4 ppm by weight.

Catalyst A is a catalyst of NiMo type on gamma alumina. The contents of metals are respectively 7% by weight NiO and 11% by weight $MoO_3$ with respect to the total weight of the catalyst, i.e. an Ni/Mo molar ratio of 1.2. The specific surface area of the catalyst is 230 $m^2/g$. Prior to its use, the catalyst A is sulphurized at atmospheric pressure on a sulphurization bench under an $H_2S/H_2$ mixture constituted by 15% by volume of $H_2S$ to 1 L/g·h of catalyst and at 400° C. for two hours. This protocol makes it possible to obtain a degree of sulphurization greater than 80%.

TABLE 3

| Example | LHSV h$^{-1}$ | added H$_2$/HC NL/L | Temperature °C. | Pressure MPa | residual MAV mg/100 g | Dimethyl-sulphide | | Methyl-ethyl-sulphide | |
|---|---|---|---|---|---|---|---|---|---|
| | | | | | | Content ppm by weight S | Conversion % | Content ppm by weight S | Conversion % |
| 2 | 1.8 | 5 | 140 | 2.5 | 0.6 | 1.1 | 46% | 3.0 | 31% |

The effluent of the selective hydrogenation step is sent into a fractionating column in order to separate at the top of the column a light gasoline cut containing hydrocarbons having less than 6 carbon atoms per molecule and at the bottom of the column a heavy gasoline cut containing hydrocarbons having 6 and more than 6 carbon atoms per molecule.

The contents of dimethyl-sulphide and methyl-ethyl-sulphide in the light gasoline cut produced are respectively 3.3 and 3.8 ppm by weight, i.e. a total content of sulphides of 7.1 ppm by weight.

Example 3 (According to the Invention)

The gasoline of Example 1 is treated in the process according to the invention with a recycle ratio of 0.33.

Taking into account the recycling, the feedstock treated in the presence of catalyst A in the selective hydrogenation reactor has a content of dimethyl-sulphide and methyl-ethyl-sulphide of respectively 2.0 and 4.5 ppm by weight.

Catalyst A is a catalyst of NiMo type on gamma alumina. The contents of metals are respectively 7% by weight NiO and 11% by weight MoO$_3$ with respect to the total weight of the catalyst, i.e. an Ni/Mo molar ratio of 1.2. The specific surface area of the catalyst is 230 m$^2$/g. Prior to its use, the catalyst A is sulphurized at atmospheric pressure on a sulphurization bench under an H$_2$S/H$_2$ mixture constituted by 15% by volume of H$_2$S to 1 L/g·h of catalyst and at 400° C. for two hours. This protocol makes it possible to obtain a degree of sulphurization greater than 80%.

TABLE 4

| Example | LHSV h$^{-1}$ | added H$_2$/HC NL/L | Temperature °C. | Pressure MPa | residual MAV mg/100 g | Dimethyl-sulphide | | Methyl-ethyl-sulphide | |
|---|---|---|---|---|---|---|---|---|---|
| | | | | | | Content ppm by weight S | Conversion % | Content ppm by weight S | Conversion % |
| 3 | 1.65 | 5 | 140 | 2.5 | 0.6 | 1.0 | 49% | 3.0 | 33% |

The effluent of the selective hydrogenation step is sent into a fractionating column in order to separate at the top of the column a light gasoline cut containing hydrocarbons having less than 6 carbon atoms per molecule and at the bottom of the column a heavy gasoline cut containing hydrocarbons having 6 and more than 6 carbon atoms per molecule.

The contents of dimethyl-sulphide and methyl-ethyl-sulphide in the light gasoline cut produced are respectively 3.7 and 4.6 ppm by weight, i.e. a total content of sulphides of 8.3 ppm by weight.

The invention claimed is:

1. A process for reducing the content of sulfide compounds of formula R1-S-R2, with R1 and R2 being methyl and/or ethyl radicals, in a gasoline containing diolefins, mono-olefins and sulfur, said process consisting of:

A) contacting an FCC gasoline having a boiling point between 0 and 280° C. in a mixture with a light gasoline cut recycled from C) and hydrogen in a reactor with catalyst A comprising at least one metal of group VIb and at least one non noble metal of group VIII deposited on a support, A) being carried out at a temperature in the reactor of 60° C. to 150° C. with a liquid hourly space velocity of 1 h$^{-1}$ to 10 h$^{-1}$, a pressure of 0.5 to 5 MPa and with a ratio by volume of added hydrogen/mixture of gasolines of 1 to 40 normal liters of hydrogen per liter of the mixture of gasolines vol/vol, producing an effluent having a content of diolefins and a content of sulfide compounds of formula R1-S-R2, lower than that that of the starting gasoline;

B) fractionating said effluent originating from A) in a fractionating column, separating t the top of the column a light gasoline cut containing hydrocarbons having less than 6 carbon atoms per molecule and at the bottom of the column a heavy gasoline cut containing hydrocarbons having 6 and more than 6 carbon atoms per molecule, treating the heavy gasoline cut in a hydrodesulfurization unit in the presence of hydrogen; and C) recycling a part of the light gasoline cut originating from B) into the reactor of A) with a recycle ratio of 0.1 to 0.7, in which catalyst A comprises:

a content of oxide of the metal of group VIb of 4 to 20% by weight with respect to the total weight of the catalyst, a content of oxide of the metal of group VIII comprised between 4 to 15% by weight with respect to the total weight of the catalyst, a degree of sulfurization of catalyst metals at least equal to 60%, a molar ratio between the non noble metal of group VIII and the metal of group VIb of 0.6 to 8 mol/mol, and a specific surface area of the catalyst of 30 to 300 m$^2$/g.

2. The process according to claim 1, in which the density of the metal of group VIb per unit area of the catalyst is less than or equal to 1×10$^{-3}$ gram of oxides of the metal of group VIb per m$^2$ of catalyst.

3. The process according to claim 1, in which the metal of group VIb of catalyst A is molybdenum or tungsten.

4. The process according to claim 1, in which the metal of group VIII of catalyst A is nickel, cobalt or iron.

5. The process according to claim 1, in which the metal of group VIII of catalyst A is nickel and the metal of group VIb of catalyst A is molybdenum.

6. The process according to claim 1, in which the gasoline originates from catalytic cracking or thermal cracking, a coking process, a visbreaking process or a pyrolysis process.

7. The process according to claim 3, in which the metal of group VIb of catalyst A is molybdenum.

8. The process according to claim 4, in which the metal of group VIII of catalyst A is nickel.

* * * * *